(12) United States Patent
Howard et al.

(10) Patent No.: US 8,480,886 B2
(45) Date of Patent: Jul. 9, 2013

(54) FLAT PLATE MEMBRANE BIOREACTOR WITH A LIQUID AIR SEPARATOR

(75) Inventors: Wayne Howard, Dripping Springs, TX (US); Andrew Ball, Deerfield Beach, FL (US)

(73) Assignee: Ovivo Luxembourg S.A.R.L., Munsbach (LU)

( * ) Notice: Subject to any disclaimer, the term of this patent is extended or adjusted under 35 U.S.C. 154(b) by 434 days.

(21) Appl. No.: 12/815,235

(22) Filed: Jun. 14, 2010

(65) Prior Publication Data

US 2011/0303594 A1  Dec. 15, 2011

(51) Int. Cl.
   *B01D 33/70*  (2006.01)
   *B01D 15/00*  (2006.01)

(52) U.S. Cl.
   USPC ........... 210/151; 210/201; 210/203; 210/220; 210/321.69; 210/321.75; 210/346

(58) Field of Classification Search
   USPC .................. 210/151, 201, 203, 220, 321.69, 210/321.75, 346
   See application file for complete search history.

(56) References Cited

U.S. PATENT DOCUMENTS 6,843,908 B2 * 1/2005 Okajima et al. .............. 210/151

\* cited by examiner

*Primary Examiner* — Chester Barry
(74) *Attorney, Agent, or Firm* — James Earl Lowe, Jr.

(57) ABSTRACT

A multistage immersion type membrane separator includes a liquid air separator, the liquid air separator including an outlet tube, an inlet tube, and a skirt. The outlet tube is cylindrical and has a outlet tube diameter, and the inlet pipe has an inlet pipe diameter of less than the outlet tube diameter. The inlet pipe is attached to and in communication with the outlet tube so that a mixed flow of air and liquid passing through the inlet tube is introduced into the outlet tube and flows circumferentially around the inside of the outlet tube. The inlet pipe is attached to the cylindrical outlet tube so that the inlet pipe is perpendicular to the outlet tube. The outlet tube has two ends, one end being closed and the other end being open. The skirt is attached to the outlet tube and is concentric with the outlet tube. The skirt is attached to the closed end of the outlet tube, and extends to just past the point of attachment of the inlet tube to the outlet tube. The skirt also has two open ends, and one open end penetrates through the closed end of the outlet tube.

12 Claims, 8 Drawing Sheets

- - - AIR FLOW PATH
——— LIQUID FLOW PATH

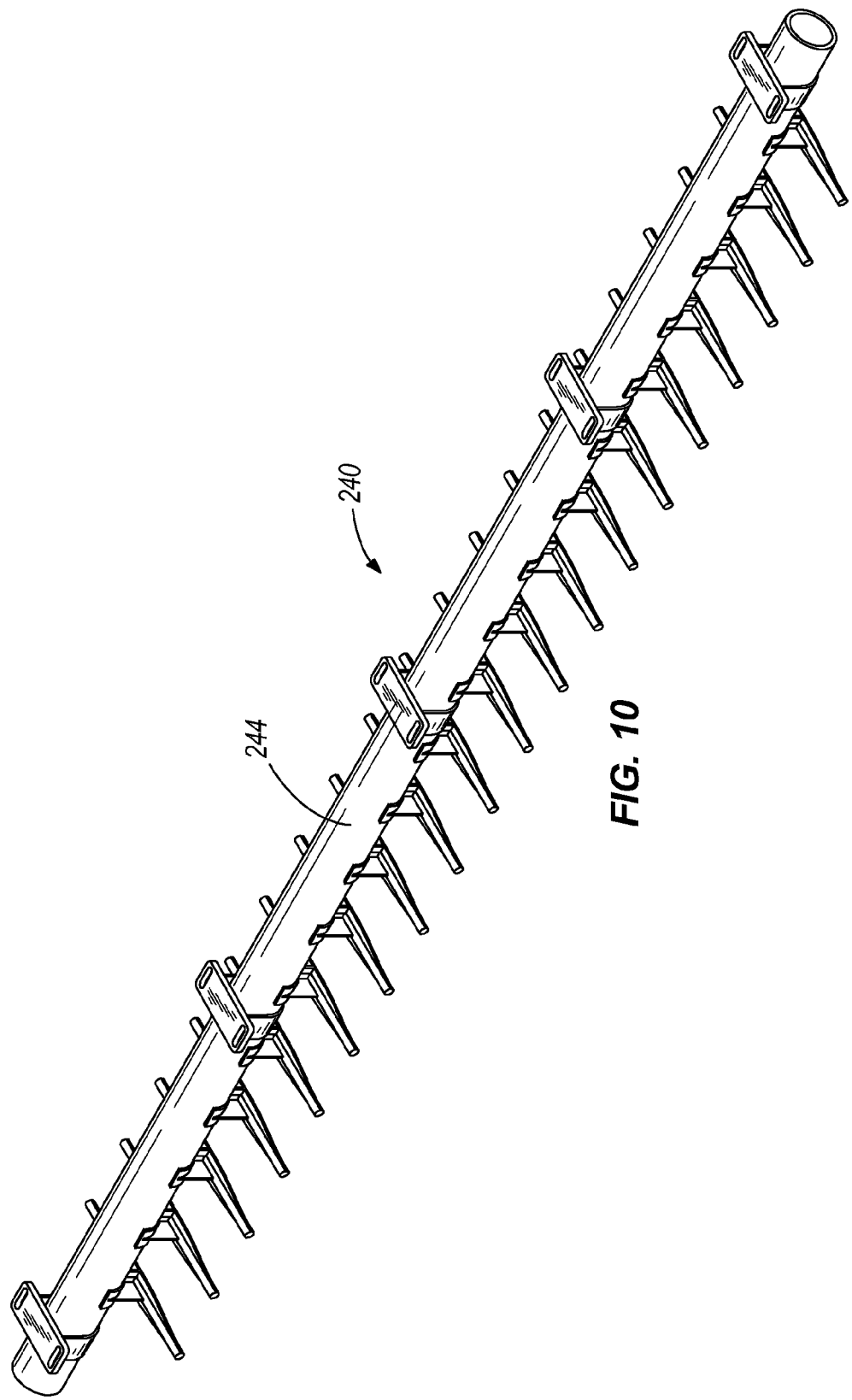

27# FLAT PLATE MEMBRANE BIOREACTOR WITH A LIQUID AIR SEPARATOR

BACKGROUND

This disclosure relates to flat plate membrane bioreactors, and a device used for discharging the bioreactor mixed air and liquid liquor stream into the atmosphere above the liquid surface of the membrane basin.

In the application of flat plate membrane bioreactors, the membranes are aerated with course bubble diffusers to prevent solids accumulation on the outside of the filter surface from slowing the filtration process. Air scouring (bubbling air across the surface of the filters) is used to keep the surface free of solids. Efficient and equal air scouring of each submerged membrane unit is critical to operation. Therefore, air scour flow rates need to be monitored, recorded and controlled. Because equal air scouring is required, the diffusers integral to each submerged membrane unit are kept clean by flushing them with mixed liquor using a unique venturi process. This process is automatically initiated by opening an automated diffuser cleaning valve.

When the automated diffuser cleaning valve is opened, air flows through the diffusers creating a venturi action, which pulls in the liquid mixed liquor through the diffusers. This air/liquid stream flows through the automated Diffuser Cleaning Valve and is deposited into the atmosphere above the liquid surface of the membrane basin.

The deposition of the liquid air stream above the water surface causes splash and spray that is undesirable.

SUMMARY

A liquid air separator according to this disclosure is a device that is intended to separate the air and water in the above-described stream without causing backpressure that will inhibit the venturi action of the diffuser cleaning operation.

More particularly, this disclosure provides a multistage immersion type membrane separator including a liquid air separator, the liquid air separator including an outlet tube, an inlet tube, and a skirt. The outlet tube is cylindrical and has a outlet tube diameter, and the inlet pipe has an inlet pipe diameter of less than the outlet tube diameter. The inlet pipe is attached to and in communication with the outlet tube so that a mixed flow of air and liquid passing through the inlet tube is introduced into the outlet tube and flows circumferentially around the inside of the outlet tube. The inlet pipe is attached to the cylindrical outlet tube so that the inlet pipe is perpendicular to the outlet tube. The outlet tube has two ends, one end being closed and the other end being open. The skirt is attached to the outlet tube and is concentric with the outlet tube. The skirt is attached to the closed end of the outlet tube, and extends to just past the point of attachment of the inlet tube to the outlet tube. The skirt also has two open ends, and one open end penetrates through the closed end of the outlet tube.

The liquid air separator works by introducing the mixed flow of air and liquid into the device through the inlet pipe into the body at a tangential flow. The mixed flow separates as the liquid has a higher density than the air. The liquid is forced to the wall of the device, while the air accumulates on the inside. The swirling liquid comes out the bottom of the device along with some air. The cylindrical body promotes a swirling action in the device to separate the air and water, eliminating undesirable splashing and spray.

BRIEF DESCRIPTION OF THE DRAWINGS

FIG. 10 is a perspective view of another embodiment of the diffuser shown in FIGS. 3 and 4.

Figure 1:
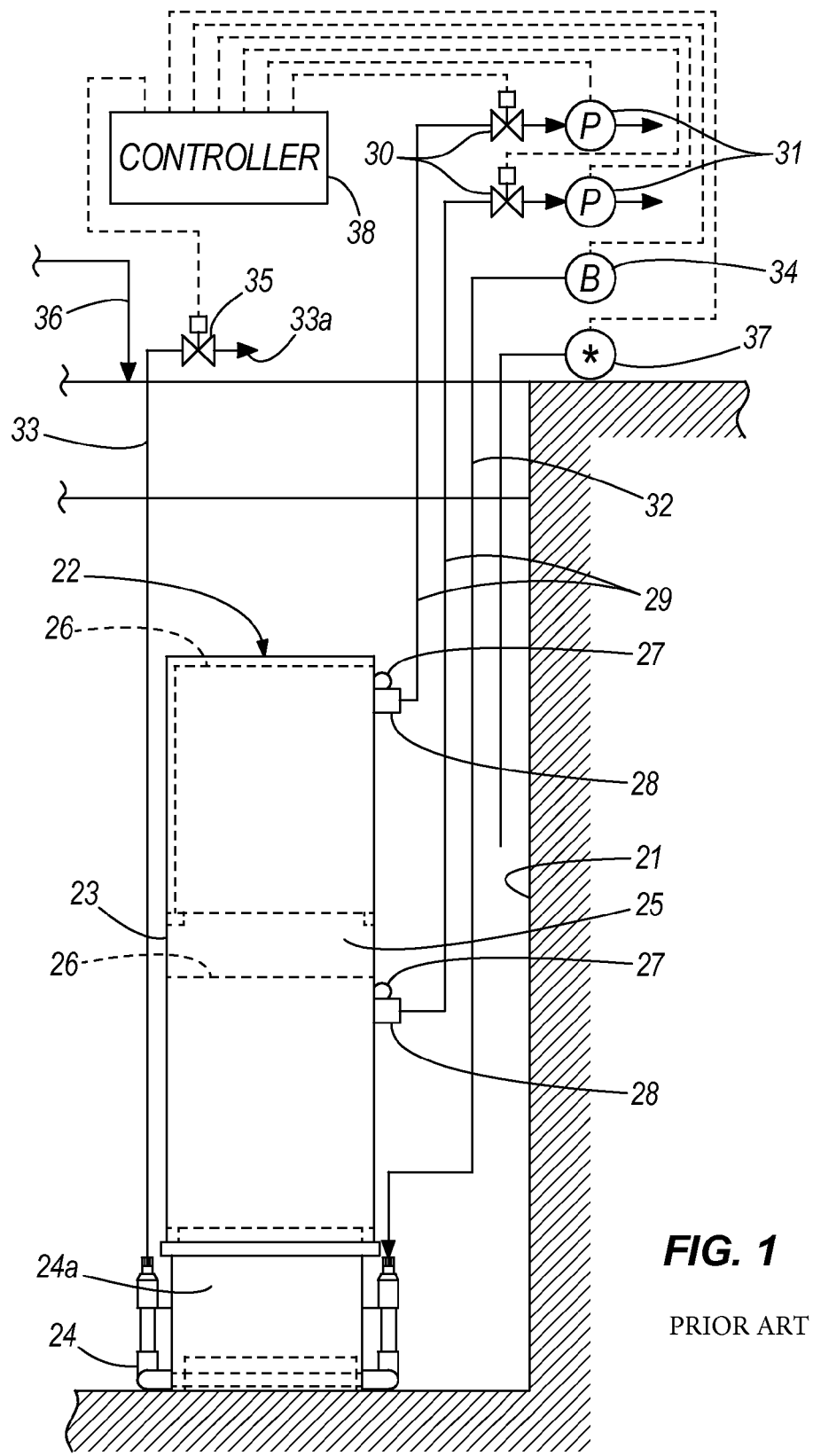
FIG. 1 is an overall front view of a multistage immersion type membrane separator.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Referring to FIG. 1, a treatment basin or tank 21 is provided to biologically treat sewage water, wastewater, etc, and a multistage immersion type membrane separator 22 is immersed therein. The membrane separator 22 has a filtration part 23 and an air diffuser 24 disposed below the filtration part 23. In the filtration part 23, a plurality of submerged membrane units in the form of plate-like membrane cartridges 26 is disposed vertically in the interior of a casing 25 opening at its top and bottom. The membrane cartridges 26 are arranged in a vertical multistage fashion in which these are disposed in parallel and spaced at intervals for forming a cross flow passage having a predetermined width.

At every stage, an individual plate-like membrane cartridge 26 is connected to a collecting part 28 via a tube 27. A collecting means are formed by the collecting part 28, a suction pipe 29 connected to the collecting part 28, and a suction pump 31 connected to the suction pipe 29 via an open/close valve 30.

An air supply pipe 32 and flushing pipe 33 are connected to the air diffuser 24, and the air supply pipe 32 is connected to a blower 34. The flushing pipe 33 is opened at its tip as an outlet 33 *a* under atmospheric pressure, and a flushing valve also referred to as an automated diffuser cleaning valve 35 is disposed in the flushing pipe 33. A raw water supply pipe 36 is connected to and a water level gage is attached to the treatment tank 21.

Although each open/close valve 30, each suction pump 31, blower 34, and the flushing valve 35 can be controlled by manual operation, a controller 38 controls these components in this preferred embodiment.

Figure 2:
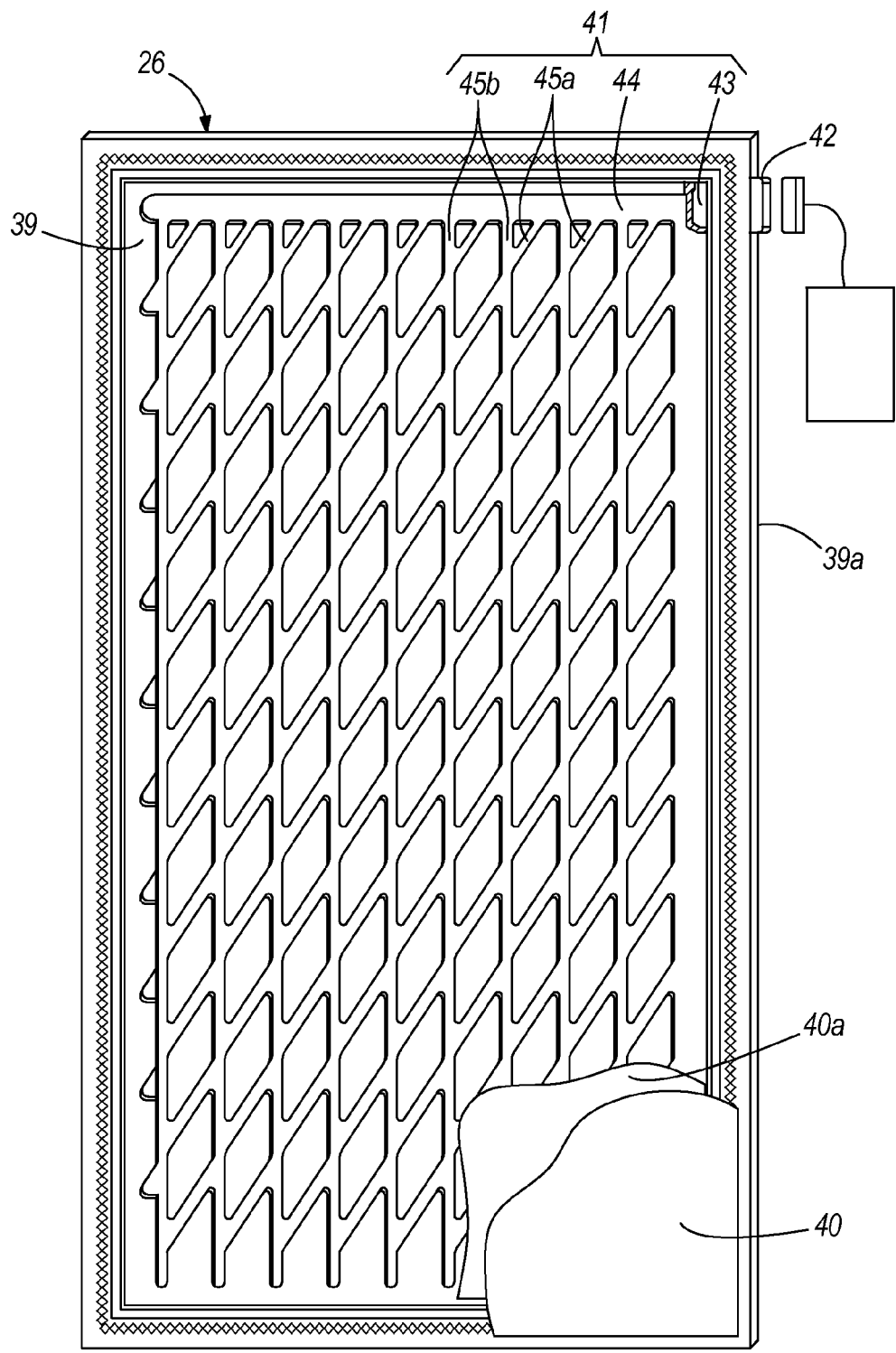
FIG. 2 is a perspective view of a plate-like membrane cartridge of the multistage immersion type membrane separator in FIG. 1.

Referring to FIG. 2, in the plate-like membrane cartridge 26, a filtration membrane 40 is attached via a spacer 40 *a* to the front and rear surfaces of a filter supporting plate 39 made of material having rigidity (e.g., resin), and the peripheral portions of the filtration membranes 40 are fused to the filter supporting plate 39. The filter supporting plate 39 has a permeated water passage 41 through which the water passing through the filtration membranes 40 flows. A permeated water outlet 42 communicated to the permeated water passage 41 is disposed at an upper portion of one side surface 39 *a* of the filter supporting plate 39. The permeated water 42 is connected to the collecting part 28 via the tube 27.

The permeated water passage 41 is formed by a collecting hole 43. Plural collecting passages 44, plural sloped conduits 45 *a*, and plural longitudinal conduits 45 *b*. The collecting hole 43 extends from the front to rear of the filter supporting plate 39 and is communicated to the permeated water outlet 42. The collecting passages 44 are formed in the shape of a groove having a predetermined width in an upper part and one side part on the front and rear surfaces of the filter supporting plate 39, and are communicated at their one end to the collecting bole 43. The sloped conduits 45 *a* are sloped at a predetermined angle to a vertical direction with respect to the front and rear surfaces of the filter supporting plate 39, and are communicated at their upper end to the collecting passage 44 by arranging such that their upper end is closer to the collecting hole 43 than their lower end. The longitudinal conduits 45 *b* are formed in a vertical direction on the front and rear surfaces of the filter supporting plate 39 and are communicated at their upper end to the collecting passage 45.

Figure 3:
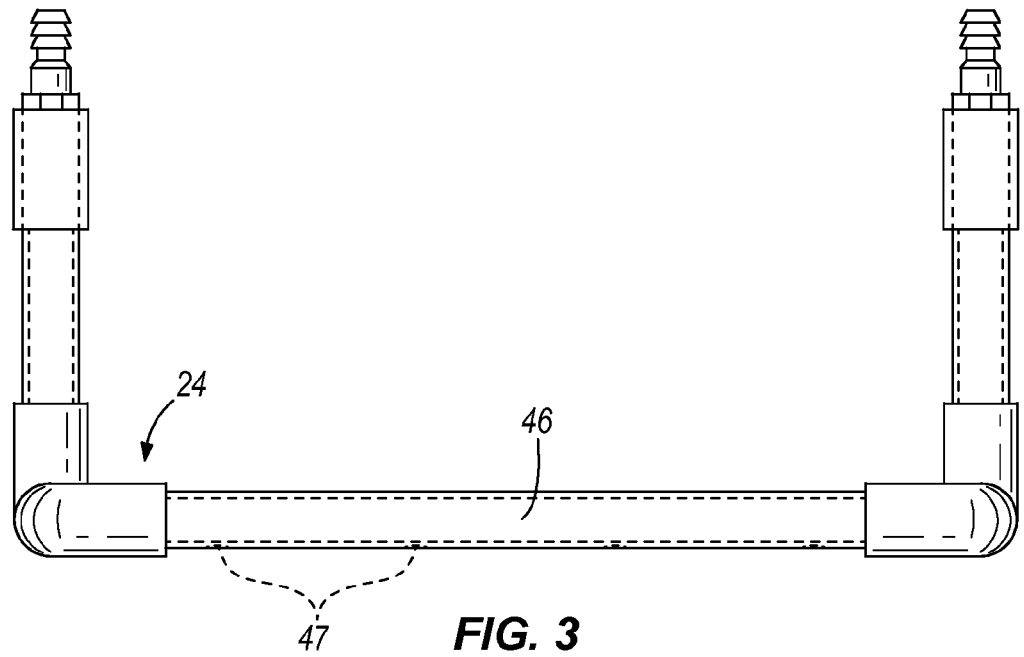
FIG. 3 is a front view of an air diffuser of the multistage immersion type membrane separator.
Figure 4:
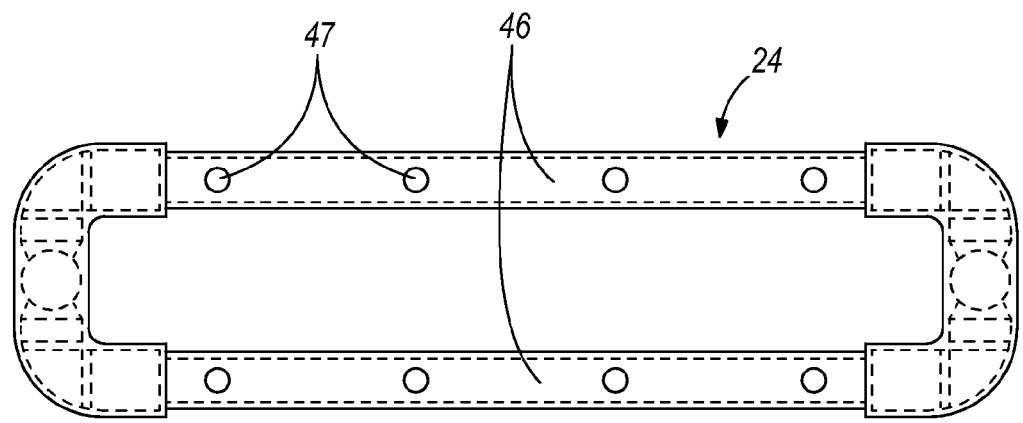
FIG. 4 is a bottom view of the air diffuser.

Referring to FIGS. 3 and 4, the air diffuser 24 has a diffuser case 24 *a* and a diffuser tube 46 disposed sidewardly. The diffuser tube 46 has in its lower part a plurality of blowholes 47. The diffuser tube 46 is connected at one end to the air supply pipe 32 and connected at the other end to the flushing pipe 33.

With this construction, during normal air diffusion operation, the flushing valve 35 is closed so that the air to be supplied at a predetermined pressure from the blower 34 is blown off from the blowholes 47 of the diffuser tube 46. The open/close valve 30 is opened for driving the suction pump 31.

During flushing operation, the flushing valve 35 is opened so that the air to be supplied from the blower 34 to the air diffuser 24 is discharged from the outlet 33 *a* via the flushing pipe 33 under atmospheric pressure.

When the outlet 33 *a* is opened under atmospheric pressure, the pressure within the diffuser tube 46 is lowered, and the back pressure of the blowholes 47 that is located below the outlet 33 *a* and thus receives water pressure is greater than the back pressure of the outlet 33 *a* that corresponds to atmospheric pressure. As a result, the air within the diffuser tube 46 flows to the outlet 33 *a* and the intra-tank mixed liquor flows via the blowholes 47 to the diffuser tube 46 that is low in pressure.

The intra-tank mixed liquor running in the diffuser tube 46 is joined with air to pass through the diffuser tube 46, thereby flushing the inside of the diffuser tube 46. This intra-tank mixed liquor is then joined with sludge within the diffuser tube 46 to enter the flushing pipe 33 and pass through the flushing pipe 33 to the outlet 33 *a* by air lift action of the air.

To the inner surface of the diffuser tube 46, sludge is attached which enters the diffuser tube 46 when the operation of the air diffuser 24 is stopped, and which is then dried by air passing through the diffuser tube 46 during air diffusion. Infiltration of the intra-tank mixed liquor facilitates the release of the dry sludge from the inner surface of the diffuser tube 46. The released sludge is joined with the intra-tank mixed liquor to come off together from the outlet 33 *a* as the air is discharged.

In the foregoing operation, when the intra-tank mixed liquor rapidly runs in the diffuser tube 46 that is low in pressure via the blowholes 47, the resistance of the intra-tank mixed liquor increases the pressure within the diffuser tube 46 to stop the flow of the intra-tank mixed liquor into the diffuser tube 46. When the intra-tank mixed liquor running in the diffuser tube 46 flows to the flushing pipe 33 and then discharged from the outlet 33 *a* by air lift action, the pressure within the diffuser tube 46 is again lowered and the intra-tank mixed liquor runs in the diffuser tube 46 via the blowholes 47. The result of this is that pulsation occurs in the diffuser tube 46 and the flushing pipe 33.

Figure 5:
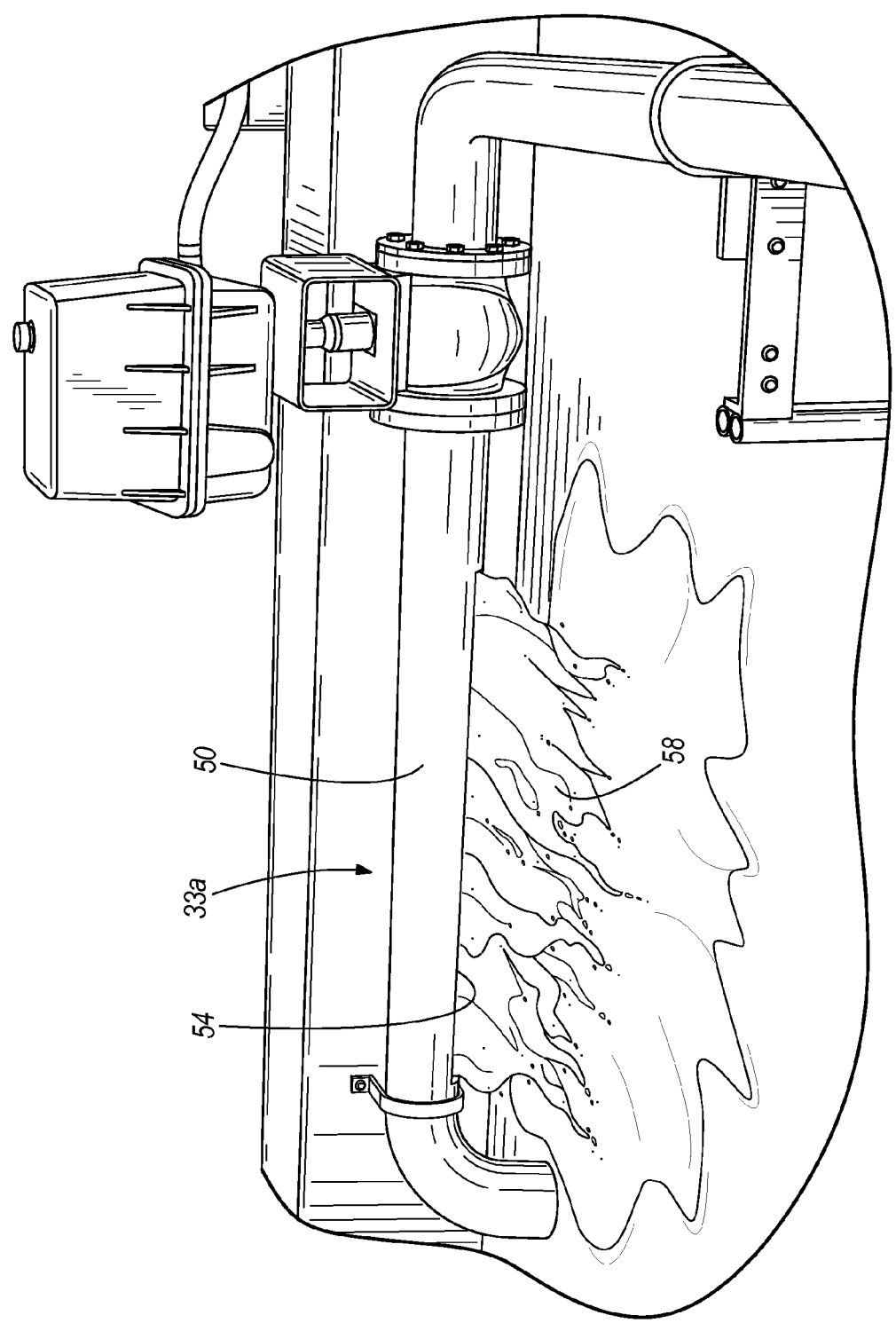
FIG. 5 is a perspective view of a prior art flushing pipe outlet including an elongated tube with a discharge slot, illustrating the undesirable splash and spray.
Figure 6:
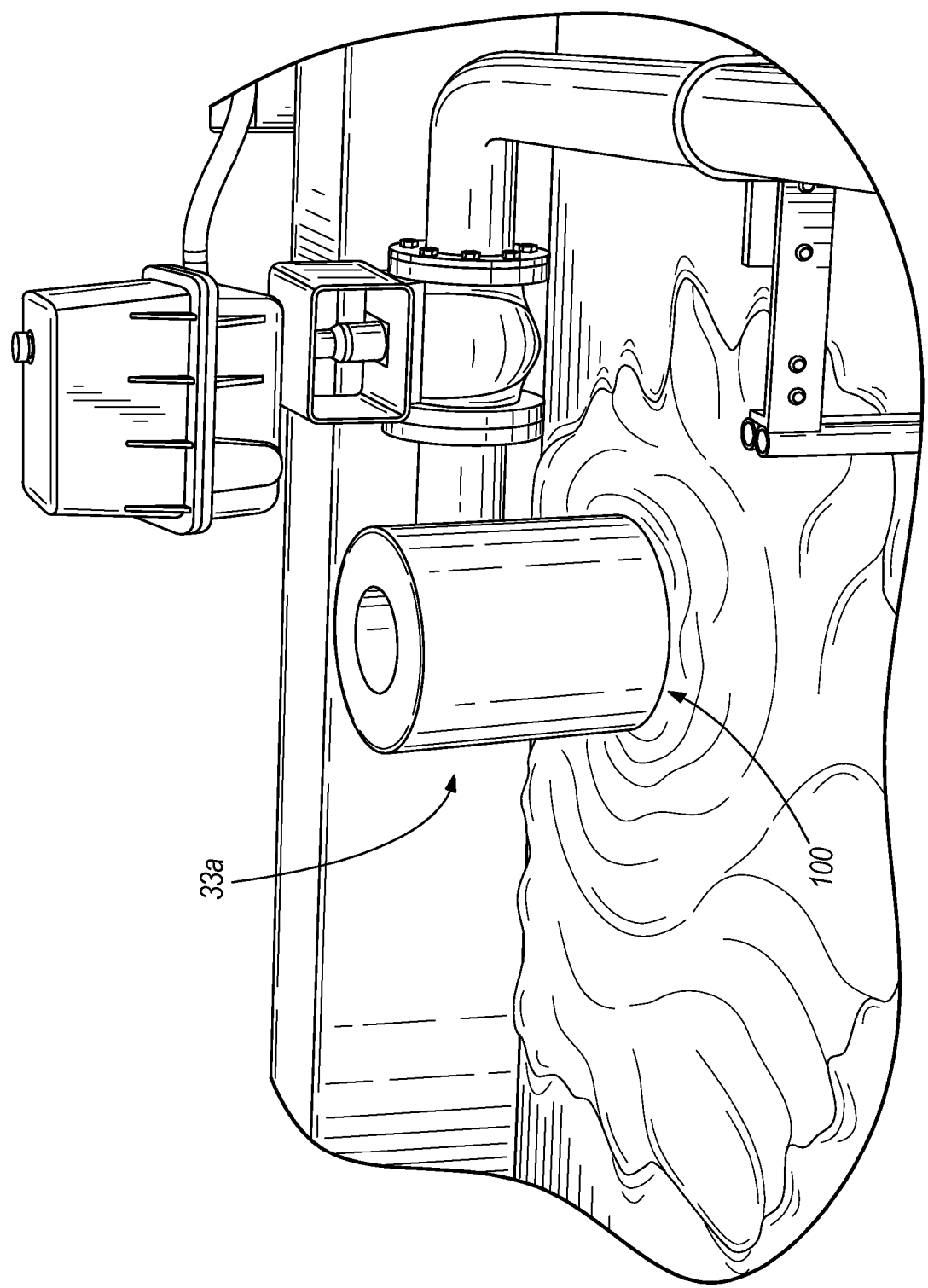
FIG. 6 is a perspective view of a flushing pipe outlet including a liquid air separator according to this disclosure.

Conventionally, as shown in FIG. 5, the flushing pipe tip or outlet 33 *a* includes an elongated tube 50 with a slot 54 extending partially along the longitudinal length of the tube 50. The conventional elongated tube 50 produces an undesirable amount of splash and spray 58, but does prevent backpressure that would inhibit the venturi action of the diffuser cleaning operation.

An alternate and preferred embodiment 240 of a portion of the diffuser 24 shown in FIGS. 3 and 4 is illustrated in FIG. 10. The two straight pipe portions of the diffuser 24 have each been replaced with a straight pipe portion 244. The straight pipe portion 244 has a plurality of spaced apart legs to support the pipe above the bottom of the basin.

In the preferred embodiment of this disclosure, the flushing pipe tip or outlet 33 *a* includes a liquid air separator 100, as shown in FIGS. 6 through 9. The liquid air separator 100 eliminates the undesirable splash and spray of the conventional elongated tube.

Figure 7:
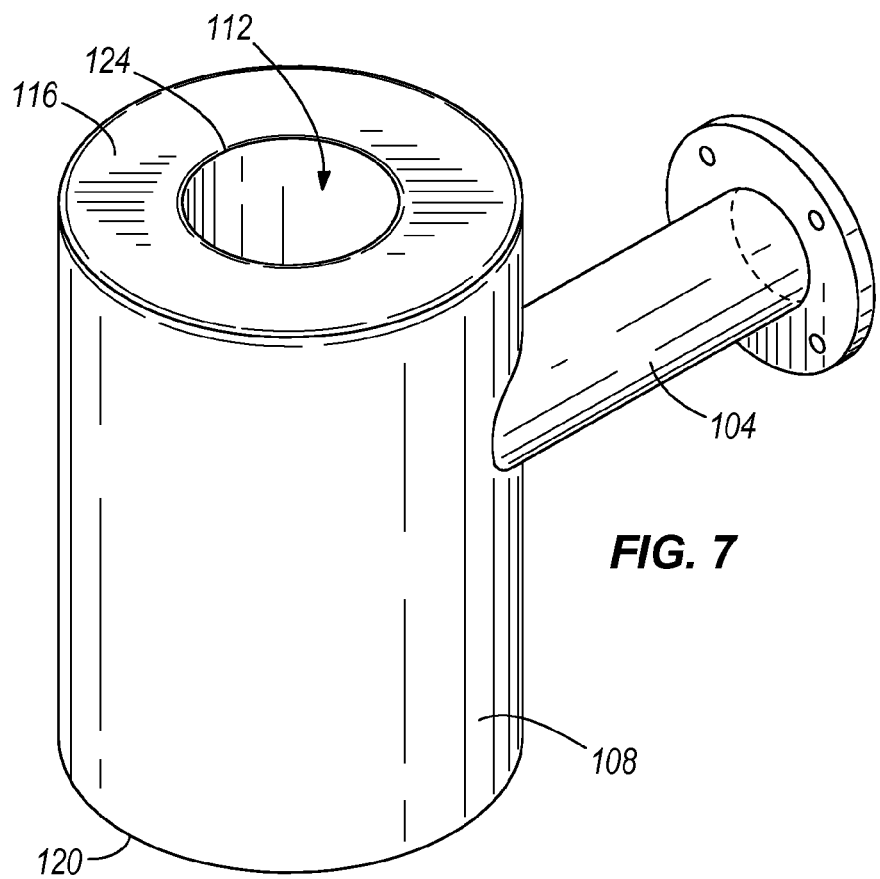
FIG. 7 is a perspective view of the liquid air separator of FIG. 6.
Figure 8:
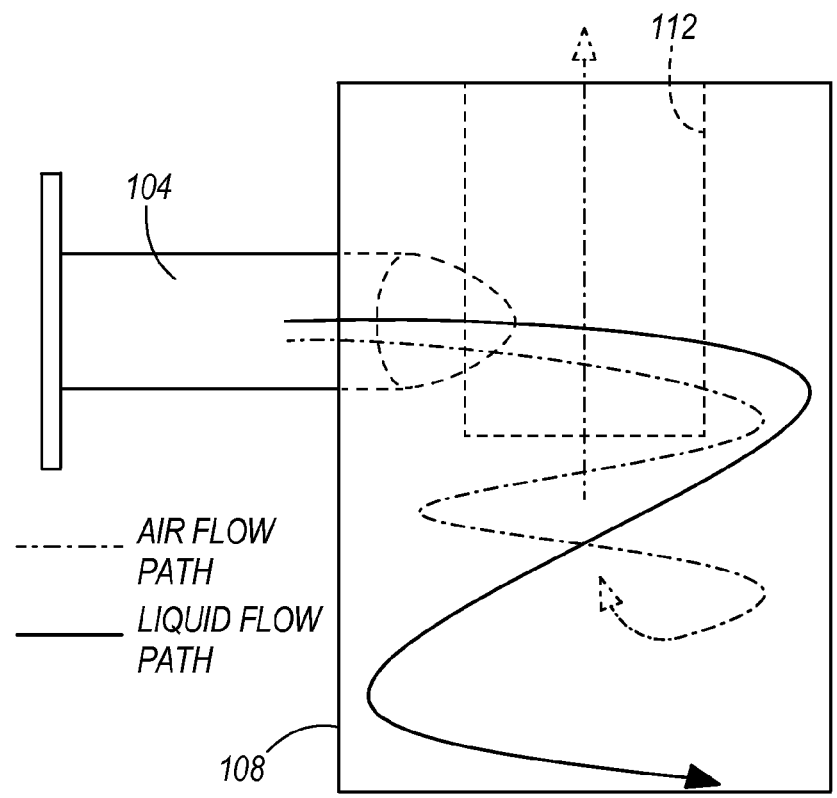
FIG. 8 is a side view of the liquid air separator of FIG. 6.
Figure 9:
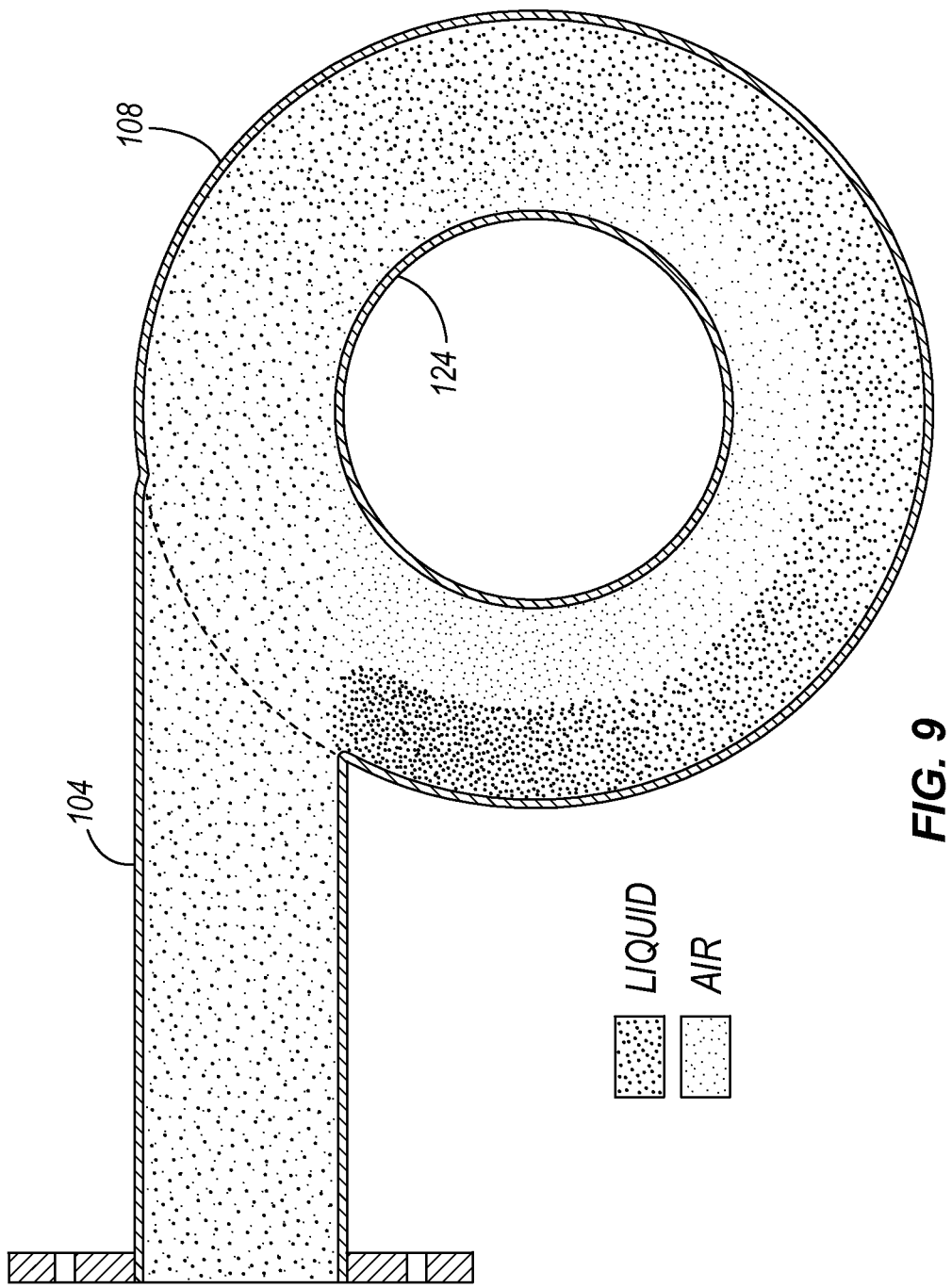
FIG. 9 is a cross sectional top view of the liquid air separator of FIG. 6, illustrating the liquid air separation.

As shown in FIGS. 7, 8 and 9, the liquid air separator 100 is a device that includes three parts, an inlet pipe 104, an outlet tube 108, and a skirt 112.

More particularly, the outlet tube 108 is cylindrical and has a outlet tube diameter, and the inlet pipe 104 has an inlet pipe diameter of less than the outlet tube diameter. The inlet pipe 104 is attached to and in communication with the outlet tube 108 so that a mixed flow of air and liquid passing through the inlet tube 104 is introduced into the outlet tube 108 and flows circumferentially around the inside of the outlet tube 108, as shown in FIG. 9. The inlet pipe 104 is attached to the cylindrical outlet tube 108 so that the inlet pipe 104 is perpendicular to the outlet tube 108.

Still more particularly, the outlet tube 108 has two ends, one end 116 being closed and the other end 120 being open. The skirt 112 is attached to the outlet tube 108 and is concentric with the outlet tube 108. The skirt 112 is attached to the closed end 116 of the outlet tube 108, and extends to just past the point of attachment of the inlet tube 104 to the outlet tube 108. The skirt 112 has two open ends, and one open end 124 penetrates through the closed end 116 of the outlet tube 108, as shown in FIG. 7.

The air and liquid mixture enters the device 100 through the inlet pipe 104 at a tangential flow to the outlet tube 108, as shown in FIG. 9. The liquid particles, by virtue of their inertia, will tend to move toward the outside wall of the outlet tube 108, from which they combine to form a liquid flow and exit the bottom of the outlet tube 108, as shown in FIG. 8. The air is forced to the inside of the outlet tube 108 and exits through the skirt 112 and the open end 120 of the outlet tube 108.

When this mixed flow enters the liquid air separator 100, the tangential force creates separation between the liquid and air because of the difference in density between the air and liquid. The liquid makes between one and two passes around the circumference of the outlet tube 108 where the air and liquid are discharged above the water surface of the basin. Some air rises through the hole 124 in the top of the device 100.

The liquid air separator 100 reduces the amount of small droplets of liquid spray that enter the atmosphere during the bioreactor diffuser cleaning operations. By separating the air and liquid flow into different streams, the liquid is not carried into the atmosphere and exits the bottom of the device 100.

Splashing and spray in the bioreactor basin is also greatly reduced during bioreactor diffuser cleaning operations. By separating the liquid and air into different streams, spray is eliminated and the liquid velocity is reduced which reduces splashing.

Inlet velocities are in the range of 15 to 35 feet per second, containing a mixed flow of sludge, or mixed liquor, and air. The sludge is considered a liquid typically containing between 0.8% and 3% fine and microscopic solids. Sludge concentrations can be up to 5% solids.

The device 100 imposes very little head loss, while achieving separation of the mixed flow and discharge without undesired splashing, while slowing the velocity of the flow. The exit velocities are typically in the range of 5 to 10 feet per second. The low head loss of the unit is important to maintain proper venturi action of the MBR diffusers. Increased pressure caused by frictional losses prevents proper venturi action in the diffusers and reduces or eliminates the flushing of the diffusers.

To maintain low pressure loss in the device 100, the skirt 112 is sized to be larger than the inlet pipe 104, with the outlet tube 108 typically twice the diameter of the skirt 112. The length of the outlet tube 108 is typically twice the diameter of the outlet tube 108, but can be shorter if required. The skirt 112 penetrates the outlet tube 108 to the bottom of the inlet pipe 104, which promotes tangential flow and prevents liquid from leaving the device 100 through the hole 124 in the top.

Various other features of this disclosure are set forth in the following claims.

The invention claimed is:

1. A multistage immersion type membrane separator in which an air diffuser is disposed under a filtration part immersed in a treatment tank, the filtration part having a plurality of plate-like membrane cartridges arranged in a vertically parallel multistage fashion and spaced at intervals for forming a cross flow passage of a predetermined width; the plate-like membrane cartridges have a filter supporting plate having rigidity on which a permeated water passage is formed, and a permeated water outlet disposed at an upper portion on one side end surface of the filter supporting plate such that it is communicated to the permeated water passage and connected to a collecting means; and the air diffuser has a diffuser tube disposed sidewardly that has plural blowholes, a flushing pipe that has at its tip an opening serving as an outlet above the diffuser tube, and a flushing valve disposed in the flushing pipe wherein the diffuser tube is communicated at its basal end to an air supply source and at its front-end to the flushing pipe, a control means communicating with said flushing valve and said air supply source, and configured such that the flushing valve is opened while supplying air to the diffuser tube, thereby to cause the air supplied to the diffuser tube to pass through the flushing to be exhausted; a mixed liquor inside a treatment tank is caused to flow backward from the blowholes into the diffuser tube; the flowed mixed liquor is caused to be exhausted after passing through the flushing pipe together with the air as an air-liquid mixed flow, said flushing pipe exhaust depositing the air and liquid stream into the atmosphere above the liquid surface of the treatment tank, said flushing pipe tip including a liquid air separator comprising:

a cylindrical outlet tube having a outlet tube diameter, and an inlet pipe have an inlet pipe diameter of less than said outlet tube diameter, said inlet pipe being attached to and in communication with said outlet tube so that a mixed flow of air and liquid passing through the inlet tube is introduced into the outlet tube and flows circumferentially around the inside of said outlet tube.

2. A multistage immersion type membrane separator in accordance with claim 1 wherein said outlet tube has two ends, one end being closed and the other end being open.

3. A multistage immersion type membrane separator in accordance with claim 1 wherein said liquid air separator further includes a skirt attached to said outlet tube and concentric with said outlet tube.

4. A multistage immersion type membrane separator in accordance with claim 3 wherein said outlet tube has two ends, one end being closed and the other end being open, and wherein said skirt is attached to said closed end of said outlet tube, and extends to just past the point of attachment of said inlet tube to said outlet tube.

5. A multistage immersion type membrane separator in accordance with claim 4 wherein said skirt has two open ends, and wherein one open end penetrates through the closed end of said outlet tube.

6. A multistage immersion type membrane separator in accordance with claim 3 wherein said skirt has a diameter, and said skirt diameter is greater than said inlet tube diameter.

7. A multistage immersion type membrane separator in accordance with claim 1 wherein said inlet pipe is attached to said cylindrical outlet tube so that said inlet pipe is perpendicular to said outlet tube.

8. A multistage immersion type membrane separator in accordance with claim 1 wherein said outlet tube has a longitudinal length, and said outlet tube length is about two times the outlet tube diameter.

9. A multistage immersion type membrane separator in which an air diffuser is disposed under a filtration part immersed in a treatment tank, the filtration part having a plurality of plate-like membrane cartridges arranged in a vertically parallel multistage fashion and spaced at intervals for forming a cross flow passage of a predetermined width; the plate-like membrane cartridges have a filter supporting plate having rigidity on which a permeated water passage is formed, and a permeated water outlet disposed at an upper portion on one side end surface of the filter supporting plate such that it is communicated to the permeated water passage and connected to a collecting means; and the air diffuser has a diffuser tube disposed sidewardly that has plural blowholes, a flushing pipe that has at its tip an opening serving as an outlet above the diffuser tube, and a flushing valve disposed in the flushing pipe wherein the diffuser tube is communicated at its basal end to an air supply source and at its front-end to the flushing pipe, a control means communicating with said flushing valve and said air supply source, and configured such that the flushing valve is opened while supplying air to the diffuser tube, thereby to cause the air supplied to the diffuser tube to pass through the flushing to be exhausted; a mixed liquor inside a treatment tank is caused to flow backward from the blowholes into the diffuser tube; the flowed mixed liquor is caused to be exhausted after passing through the flushing pipe together with the air as an air-liquid mixed flow, said flushing pipe exhaust depositing the air and liquid stream into the atmosphere above the liquid surface of the treatment tank, said flushing pipe tip including a liquid air separator comprising:

a cylindrical outlet tube having a outlet tube diameter, said outlet tube having two ends, one end being closed and the other end being open, an inlet pipe have an inlet pipe diameter of less than said outlet tube diameter, said inlet pipe being attached to and in communication with said outlet tube so that a mixed flow of air and liquid passing through the inlet tube is introduced into the outlet tube and flows circumferentially around the inside of said outlet tube, and a skirt attached to said outlet tube and concentric with said outlet tube, said skirt being attached to said closed end of said outlet tube, and extending to just past the point of attachment of said inlet tube to said outlet tube, said skirt having two open ends, with one open end penetrating through the closed end of said outlet tube.

10. A multistage immersion type membrane separator in accordance with claim 9 wherein said skirt has a diameter, and said skirt diameter is greater than said inlet tube diameter.

11. A multistage immersion type membrane separator in accordance with claim 10 wherein said inlet pipe is attached to said cylindrical outlet tube so that said inlet pipe is perpendicular to said outlet tube.

12. A multistage immersion type membrane separator in accordance with claim 11 wherein said outlet tube has a longitudinal length, and said outlet tube length is about two times the outlet tube diameter.

\* \* \* \* \*